United States Patent [19]
Knopf et al.

[11] 3,839,293
[45] Oct. 1, 1974

[54] METHOD FOR PRODUCING CONDENSATION POLYMERS

[75] Inventors: Robert John Knopf; Kenneth Look Hoy, both of St. Albans, W. Va.

[73] Assignee: Union Carbide Corporation, New York, N.Y.

[22] Filed: Dec. 12, 1972

[21] Appl. No.: 314,371

[52] U.S. Cl........ 260/77.5 AA, 260/2 EA, 260/2 R, 260/75 M, 260/47 EA, 260/77.5 D, 260/77.5 CH, 260/78 R, 260/79.1, 260/79.3 M
[51] Int. Cl............................................. C08g 22/00
[58] Field of Search ....... 260/77.5 AA, 75 M, 78 R, 260/77.5 D, 79.3 M, 79.1, 2 EA, 47 EA, 2 R, 77.5 CH

[56] References Cited
UNITED STATES PATENTS
3,427,287  2/1969  Pengilly........................... 260/75 M Primary Examiner—M. J. Welsh
Attorney, Agent, or Firm—Francis M. Fazio

[57] ABSTRACT

Condensation polymerizations are carried out by feeding at least one primary polymerizable feed composition, which is continually varying in compositional content, from a primary feed source to a polymerization zone while simultaneously feeding at least one different secondary feed composition from a secondary feed source to said primary feed source and polymerizing the reactants mixture present in the polymerization zone.

9 Claims, No Drawings

METHOD FOR PRODUCING CONDENSATION POLYMERS

BACKGROUND OF THE INVENTION

Many different condensation polymerizations are used regularly to produce commercially acceptable polymers. In these polymerization reactions the resultant product is a mixture of molecules of different molecular weights; in many instances the mixture contains molecules having molecular weights as low as several hundred together with molecules having molecular weights that are high in the thousands. The molecular weight distribution of a particular mixture is readily determined by gel permeation chromatography analysis and when plotted shows a typical bell shaped curve with tails at each end that are due to the low and the high molecular weight species present. The presence of low molecular weight polymer in any appreciable amount is not desirable since low molecular weight species are detrimental to certain mechanical properties of the polymer. The high molecular weight species may also be detrimental in that they can present problems in polymer processability; these species generally form gels which plug the holes of a spinnerette or appear as lumps or irregularities on the surface of films. Generally, polymers characterized by relatively narrow molecular weight distribution curves are preferred since they usually possess the best overall performance and processability characteristics. Thus, continuous efforts are being made by polymer producers to discover methods of maintaining control of the polymerization reaction so as to enable them to control the amounts of the low and high molecular weight species formed and thus control the molecular weight distribution. While control of average molecular weight has long been possible through the use of chain terminating agents in condensation polymerization reactions, it has not heretofore been possible to control, at will, the molecular weight distribution.

SUMMARY OF THE INVENTION

The process of this invention now makes it possible, among other things, to control the molecular weight distribution of condensation polymers. By this process the molecular weight distribution is controlled by introducing at least one primary polymerizable feed composition from at least one primary feed source to a polymerization zone or reactor, simultaneously adding to at least one primary feed source at least one secondary feed composition from at least one secondary feed source so as to continually change the compositional content of the reactants comprising the primary polymerizable feed composition, and polymerizing the mixture present in the polymerization zone.

DESCRIPTION OF THE INVENTION

The process of this invention is applicable to condensation polymerization reactions which undergo a fast reaction (preferably with low heat input requirement), are free from any significant interference by side reactions that will upset the stoichiometry, use reactants that react as rapidly as they are fed into the polymerization zone and react at equivalent rates, and produce polymers that remain soluble, preferably, throughout the period during which reactants are fed into the polymerization zone.

Representative condensation polymerization reactions that can be carried out by the process of this invention include the production of polyesters and copolyesters by the reaction of diacyl halides with dihydroxyl or dimercapto compounds in the presence of acid acceptors using a monoacyl halide as the chain terminator; the production of polyamides and copolyamides by the reaction of diacyl halides with diamines in the presence of excess diamine as acid acceptor using a monoacyl halide as the chain terminator; the production of polyurethanes by the reaction of polyisocyanates with polyols, preferably diisocyanates and diols using a monohydroxyl compound or monoisocyanate as chain terminator; the production of polyureas by the reaction of polyisocyanates with polyamines, preferably diisocyanates and diamines using a monoamine as the chain terminator; the production of copoly(urethane-ureas) by the chain extension of polyurethanes containing free isocyanator groups with diamines using a monoamine as the chain terminator; the production of polycarbonates by the reaction of diphenols with phosgene using a chloroformate as the molecular weight controller; the production of polysulfonates by the reaction of organic disulfonyl halides with dihydroxyl or dimercapto compounds using a monosulfonyl halide as chain terminator; the production of polyureylenes by the reaction of polyisocyanates, preferably diisocyanates, with hydrazines or dihydrazides using a 1,1-disubstituted hydrazine as chain terminator; the production of polyoxamides by the reaction of diamines with esters of oxalic acid using a monoamine as the chain terminator; the production of polysulfonamids by the reaction of organic disulfonyl halides with diamines using a monosulfonyl halide as chain terminator; the production of polysulfides by the reaction of alkali metal salts of dithiols with dialkyl halides using a monoalkyl halide as chain terminator; the production of polycarbodiimides by the self-condensation of diisocyanates in the presence of phospholine oxide catalysts using monoisocyanates as chain terminators; the production of certain thermoplastic polyepoxides such as those from diglycidyl ethers was dicarboxylic acids or secondary diamines using a monoglycidyl ether as chain terminator. In addition to the condensation polymerization reactions set forth above, other condensations are known, including mixed condensation polymerization reactions, all of which are included within the scope of this invention. In all instances, a monofunctional reactant must be included in the process of this invention to act as chain terminator and enable control of molecular weight distribution as well as to control the average molecular weight of the polymer.

Those skilled in the art are fully familiar with the condensation polymerization reactions described above. They are also fully familiar with the reactants used in each specific condensation reaction and the conditions under which it is generally carried out. In view of this general, well-known knowledge, it is unnecessary for use to include detailed explanations of conventional reactants, reaction conditions, proportions of reactants, catalysts, stabilizers, colorants, or other materials conventionally used, in this application; the acquired knowledgethereof being known to the skilled individual. Our invention is an improved and novel process not heretofore known to those skilled in the art that enables one to control the molecular weight distribution of condensation polymers produced using the known reactants, including the known chain terminators, for the known condensation polymerization reaction, thus, the description in this application will emphasize the improved process per se and not the specific reactants that are employed and that are so well known to the skilled scientist. The process of this invention enables a polymerization scientist to control the molecular weight distribution of the condensation polymer produced.

In this novel process, polymers are produced by a process in which the secondary feed composition, initially present in the secondary feed source, is introduced into the primary polymerizable feed composition situate in the primary feed source; simultaneously with this transfer of secondary feed composition primary polymerizable feed composition is introduced into the polymerization zone from the primary feed zone and the condensation polymerization reaction takes place in the polymerization zone or reactor. During the simultaneous flows from the secondary feed source into the primary feed source and from the primary feed source into the polymerization zone there results a continual change in the compositional content of the contents of the primary feed source; thus, there is also a continual change in the compositional content of the reactants mixture that is introduced into the polymerization zone. The distinguishing feature of this process over the processes heretofore known is the introduction of at least one primary polymerizable feed composition to the polymerization zone from at least one primary feed source while simultaneously continually changing the compositional content of said primary polymerizable feed composition by introducing at least one different secondary feed composition from at least one secondary feed source to said primary polymerizable feed composition in the primary feed source.

In a typical condensation polymerization reaction in which the instant process is useful two reactants are generally used for the production of the polymer. In the process one of the reactants is initially charged to the polymerization zone together with solvent and catalyst (if required) plus any other desired additive and the second reactant together with the chain terminator is then fed into the polymerization zone from the primary feed source while feeding secondary feed composition, simultaneously, from the secondary feed source to this primary feed source. In a condensation reaction, the second reactant is also known as the chain extender. The total amount of the second reactant can initially be in the primary feed source with the total amount of the chain terminator initially located in the secondary feed source; or the total amount of the chain terminator can initially be in the primary feed source with the total amount of the second reactant initially located in the secondary feed source; or a fraction of the second reactant and a fraction of the chain terminator are both initially present in the primary feed source with the balance of each being present in the secondary feed source with the content of each thereof initially present in the primary feed source being different than the content of each thereof initially present in the secondary feed source. In any instance, a suitable solvent or mixture of solvents can be present in the polymerization reactor or the primary feed source or the secondary feed source. During the condensation polymerization reaction the primary polymerizable feed composition present in the primary feed source is fed into the polymerization zone while simultaneously feeding secondary feed composition from the secondary feed source into the primary feed source.

The polymerization zone is any reactor, properly equipped, that can be used for the production of polymer. The different types of reactors and their suitability for a particular polymerization reaction are well known to those skilled in the art and do not require elaboration herein. Connecting to the polymerization reactor is at least one primary feed source. The term primary feed source defines one or more tanks or sources of polymerizable reactants feeding directly into the polymerization zone or reactor, for example, it can be an in-line mixer or a tank; there can be one or more primary feed sources. The primary feed source is equipped with efficient mixing means to assure adequate mixing of the contents thereof. Connecting, in turn, to any of the primary feed sources is at least one secondary feed source. The term secondary feed source defines one or more tanks or sources of reactants feeding to any of the primary feed sources. There can be one or more secondary feed sources with all of the secondary feed sources feeding directly into the primary feed source, or one or more of the secondary feed sources can feed in series to another secondary feed source and be thoroughly mixed therein with finally an ultimate secondary feed source feeding directly into one or more of the primary feed sources. The rate of feed from any one feed source to any other feed source or tank, whether primary or secondary, can be varied at the will of the skilled scientist to meet his desires and objectives. The configuration that can be engineered are many; however, in all instances there must be a polymerization zone or reactor connected to at least one primary feed source or tank equipped with mixing means which in turn is connected to at least one secondary feed source or tank which secondary feed sources (when more than one thereof is used) can all or in part feed directly into one or more of the primary feed sources or tanks or can feed in series into one another and be thoroughly mixed therin and ultimately feed into the primary feed source or tank.

The primary polymerizable feed composition is defined as the mixture of reactants present at any particular time during the reaction in the primary feed source. The compositional content of the primary polymerizable feed composition is continually changing as secondary feed composition is fed into and mixed with it. By the term compositional content is meant the content or concentration in the polymerizable feed composition of each reactant therein. As becomes apparent from this teaching and description the simultaneous feeding of primary polymerizable feed composition from the primary feed source to the polymerization zone and feeding of a different secondary feed composition from the secondary feed source to the primary feed source will result in a continual change of the content or concentration of each reactant present in the primary polymerizable feed composition or in the compositional content of the primary polymerizable feed composition. This continual change in compositional content can also occur in the secondary feed compositions when more than one thereof are being used and they are feeding in series into each other before ultimately feeding into the primary polymerizable feed composition.

The secondary feed composition is the mixture of reactants present at any particular time in any one or more of the secondary feed sources or tanks and can contain the same types of additives that were previously indicated could be present in the primary polymerizable feed composition.

As indicated, in the process of this invention there are used primary polymerizable feed compositions and secondary feed compositions. The primary polymerizable feed composition can intially contain a single polymerizable reactant or it can intially contain a plurality of polymerizable reactants; the same is true for the initial content of reactants in the secondary feed composition. However, when the primary polymerizable feed composition is a single reactant the secondary feed composition cannot be solely that same single reactant; it can, however, be a different single reactant or a mixture of a plurality of reactants or a mixture of a plurality of reactants that can include that same reactant in the mixture. Likewise, when the primary polymerizable feed composition is a mixture of a plurality of reactants the secondary feed composition cannot be that same mixture having the same concentrations for each reactant; it can, however, be a single reactant or it can be a different mixture of reactants or it can be a mixture of the same reactants but at different initial concentrations of the reactants. The important and ever present factor is that the initial compositional contents of the primary polymerizable feed composition and of the secondary feed composition are always different; they are not initially identical in make-up of reactants.

As a result of the initial differences in the compositional contents of the primary and secondary feed compositions and of the simultaneous addition of secondary feed composition to primary polymerizable feed composition while the primary polymerizable feed composition is introduced into the polymerization zone there is a continual variation in the compositional content of the primary polymerizable feed composition. Hence, any portion of the primary polymerizable feed composition entering the polymerization zone is at all times different than the portion that preceded it and the portion that succeeds it. Consequently, the composition of the polymer produced in the reactor during the addition is likewise continuously changing and reflects at any instant the composition of the primary polymerizable feed composition entering the polymerization zone. In a rapid polymerization reaction, one wherein there is essentially instantaneous reaction of the reactants introduced to the polymerization zone, one has what is known as a reactant starved system. In other reactions one may have a so-called reactant rich system, i.e., a system in which there is some time delay between introduction of the reactants to the polymerization zone and essentially complete polymerization of the reactants. Thus, in a reactant starved system the polymer produced at any one period of time differs in constitutional content from the polymer produced prior to that period of time or subsequent to that period of time. However, in a reactant rich system the composition of the polymer formed at any instant is dependent upon the concentration of each reactant in the polymerization zone and the respective reactivity of each reactant present therein in relation to the other reactants.

The condensation polymers produced by the process of this invention are produced by chemical reactions that are essentially instantaneous and thus can be considered reactant starved reaction systems; in this specification the process is called a reactant starved condensation polymerization. The process produces polymer compositions containing polymer molecules having an infinite variation in molecular structures but having a narrower molecular weight distribution since the molecular weight distribution can be controlled by adjusting and controlling the concentration of chain terminator present in the primary polymerizable feed composition fed into the polymerization zone. In those instances in which a broader molecular weight distribution is desired, the process also finds applicability. The term infinite variation in molecular structures means the mixture of the infinite number of different polymer molecules having different molecular weights produced in the polymerization zone.

The process of the invention can be described in its simplest manner by a condensation polymerization reaction involving a single primary feed source initially containing a single condensation polymerizable reactant and a single secondary feed source initially containing a single different reactant. The contents in the primary feed source or tank at any time during the process are known as the primary polymerizable feed composition and the contents of the secondary feed source or tank are known as the secondary feed composition. Secondary feed source feeds into primary feed source by suitable lines and pumps; primary feed source is equipped with an efficient stirrer or mixer and feeds into the polymerization zone. At the start of the condensation polymerization reaction the flow of primary polymerizable feed composition from primary feed source to the polymerization zone is commenced at a predetermined rate, simultaneously the flow of secondary feed composition from secondary feed source to the primary feed source is initiated and this rate of flow can be the same as or different than the rate of flow from the primary feed source to the polymerization zone. As the secondary feed composition enters the primary feed source it is thoroughly mixed with the contents thereof and resulting in a continual change in the compositional content of the primary polymerizable feed composition. This continually changing primary polymerizable feed composition is simultaneously and continuously entering the polymerization zone and the polymer produced therein is varied in accord with the compositional content of the reactants mixture in the polymerization zone. As is apparent from the prior description either or both of the primary or secondary feed sources can contain more than one reactant.

The variations in the engineering arrangements of the primary and secondary feed sources are innumerable and no attempt will be made to set forth each specific tank configuration or arrangement possible; these can readily be devised by skilled individuals at will for the purpose of obtaining maximum operational efficiency or for the purpose of obtaining products having certain desired properties. In the preceding paragraph there has been outlined a simple arrangement employing a single primary feed source and a single secondary feed source. Slightly more complex arrangements would be those wherein there was a single primary feed source and a plurality of secondary feed sources; in these instances all of the secondary feed sources could be feeding in parallel directly into the primary feed source or some of the secondary feed sources could be feeding in series to other secondary sources with at least one secondary feed source, whether in series or not, ultimately feeding directly into the primary feed source. Other arrangements would be those wherein there was a plurality of primary feed sources; in these instances there could be a single secondary feed source feeding into one or more of the plurality of the primary feed sources, or there could be a plurality of secondary feed sources all feeding in parallel directly into only one of the primary feed sources, or a plurality of secondary feed sources directly feeding into more than one primary feed source or all of the plurality of secondary feed sources could be feeding in series into only one of the primary feed sources, or the plurality of secondary feed sources can be feeding in series into more than one of the primary sources. When a plurality of secondary feed sources is used they can be used in any combination desired, all can be used in series, some can be used in series while others are not, or none need be used in series with all of them being added directly to the primary feed source. In all instances the primary feed sources feed the primary polymerizable feed composition to the polymerization zone; the secondary feed sources feed the secondary feed composition directly to the primary feed source or in series to another secondary feed source with the reactants therein ultimately terminating in the primary feed source before entering the polymerization zone. During these movements of reactants from one feed source to another there is a resultant continual change in the compositional content of the contents of the tank or feed source to which reactant is added and the contents of the tank are agitated to obtain efficient mixing of the contents therein. One can also vary the process by having periods of time at the start, during, or near the end of the reaction wherein there is feeding of primary polymerizable feed composition from the primary feed source into the polymerization reactor without any simultaneous feeding of secondary feed composition into the primary feed source or tank for a selected period of time. In addition, the flow rates between feed tanks or polymerization zone can be varied at will at any time during the condensation polymerization reaction. One can also, with suitable known means, using variable feed valves, feed reactants from a plurality of secondary feed sources through an in-line mixer which serves as the primary feed source wherein the primary polymerizable feed composition is produced. The in-line mixer then feeds the primary polymerizable feed composition directly into the polymerization zone.

The processes of this invention can be used to polymerize any mixture of reactants that will co-react or copolymerize with each other at a rate such that there is no substantantial build-up of any one reactant or group of reactants while the other reactants are reacting and forming the condensation polymer. The invention is not restricted to any limited group or class of reactants, the process is broad in its application and use to any reactantstarved condensation polymerization reaction.

The concentration of a particular reactant initially present in the primary polymerizable feed composition or initially present in the secondary feed composition can vary from 0.01 weight per cent to 100 weight per cent based on the total weight of all the reactants initially present in the particular feed composition. These concentrations can be varied at the will of the skilled individual, as is recognized in the art, to obtain the particular final concentrations of each reactant in the polymer or copolymer or to obtain a particular property or characteristic in the condensation polymer. The rates of flow from secondary feed sources and from primary feed sources can also be varied at the will of the skilled individual and do not require elaborate discussion herein. The process employs the temperature and pressure conditions known suitable for the reactants employed in the different known condensation polymerizations.

While the process of this invention can be used to produce any condensation polymer that satisfies the polymerization reaction conditions set forth in the first two paragraphs of the section entitled *Description Of The Invention*, it will be more specifically illustrated by the typical reaction involving the production of copoly-(urethane-urea) elastomers. This class of condensation polymers was stuided in detail because of their commercial importance as protective coatings and in the production of elastic fibers.

The copoly(urethane-urea) elastomers are usually produced by reacting a diisocyanate-terminated polyurethane prepolymer with a diamine or mixture of diamines as the chain extender and a monoamine or mixture of monoamines as the chain terminator. The amines form the urea linkages in the elastomer. Any of the known diisocyanateterminated polyurethane prepolymers and any of the known amines can be used, all of which are well known to those skilled in the art; illustratively, reference is made to the disclosures in U.S. Pat. Nos. 3,404,131, 3,361,844, 3,383,365, and U.S. 3,379,683, which disclosures are incorporated herein as are the reaction conditions discussed therein. The last cited reference illustrates well the use of a chain terminating agent (monofunctional) amine in the reaction for molecular weight control.

In the production of copoly(urethane-urea) elastomers, three major reactions are known to be involved. These are the prepolymer preparation, the chain extension of the prepolymer, and the chain termination. All three steps or reactions were subjected to the process of this invention and it was noticed that there was no observable response for the prepolymer phase, an observable but commercially insignificant response for the chain extension phase, and an observable and commercially significant response for the chain termination phase of the reaction with the major noticeable responses being in solution stability and molecular weight distribution. From these observations it was concluded that the process of this invention is generally of greatest importance in the chain termination phase in the process for the production of copoly(urethane-urea) elastomers in that it permitted control of the molecular weight distribution and enabled the dimunition of low molecular weight and/or high molecular weight species contents in the final product.

In our study of the process a copoly(urethane-urea) elastomer was produced by the reaction of a mixture of two polycaprolactone diols with 4,4' (phenylisocyanate, a mixture of ethylenediamine and 1,3-diaminopropane as the chain extenders, and dibutylamine as the chain terminator, except where otherwise indicated.

In conducting the examples the polymerization apparatus consisted of a polymerization reactor or zone equipped with a stirrer, thermometer, inert gas inlet, and inlet points for the introduction of reactants into the polymerization zone. Connected directly to the polymerization zone through the inlets for the introduction of reactants is one or more primary feed source or tank that is itself equipped with a stirrer. Then, connected to the primary feed source and feeding into it is one or more secondary feed source or tank. All of the tanks are properly vented and, where desired, can be equipped with dessicant tubes or inert gas inlet sources; they are also equipped with suitable flow-control means for controlling the flow of reactants from one source into another. Parts are by weight unless otherwise indicated.

EXAMPLES 1 to 4

In our study of the three phases of the copoly(urethane-urea) elastomer production, the process of this invention was initially applied to the prepolymer phase used to produce the isocyanate-terminated prepolymer. In this part of the study 206.8 parts of 4,4'-methylenebis-(phenylisocyanate), and 166.8 parts of dimethylformamide were charged to the polymerization zone; this zone was purged with nitrogen throughout the entire reaction. The primary polymerizable feed composition in the primary feed source had an initial content of 480 parts of the reaction product of one mole of toluene diisocyanate with two moles of a diethylene glycol started polycaprolactone diol having an average molecular weight of 1,250 and 480 parts od dimethylformamide. The secondary feed composition in the secondary feed source initially contained 320 parts of the diethylene glycol started polycaprolactone diol having an average molecular weight of 1,250 and 320 parts of dimethylformamide (DMF). While maintaining a temperature of 25° to 45°C. in the polymerization zone, primary polymerizable feed composition from primary feed source was fed into the polymerization zone at a rate of 10.7 ml. per minute and stirred therein. Simultaneously, secondary feed composition from secondary feed source was fed into primary feed source at a rate of 4.26 ml. per minute and thoroughly mixed therein. The feeding sequences caused a continual change during the reaction in the compositional content of the reactants in the primary polymerizable feed composition present in primary feed source. The feed time covered a period of three hours. The original ratio of free isocyanate groups in the 4,4-methylenebis-(phenylisocyanate) to total hydroxyl groups in the diols was 1.85 to 1.0. There was produced an isocyanate-terminated prepolymer solution having an average equivalent weight of about 3,190 (Prepolymer A). A duplicate run was carried out under the same conditions to produce an isocyanate-terminated prepolymer solution having an average equivalent weight of about 3,010 (Prepolymer B). For comparative purposes a prepolymer was produced using the same reactants and conditions with the exception that a uniform mixture of the total amounts of the two diols was prepared initially and this uniform mixture was added as the sole feed stream to the polymerization zone. This comparative isocyanate-terminated prepolymer had an average equivalent weight of about 2,950 (Comparative I).

Prepolymer A, Prepolymer B and Comparative I were used to produce copoly(urethane-urea) elastomer solutions by reacting with mixtures of ethylenediamine and 1,3-diaminopropane as chain extenders and diethylamine as the chain terminator, using the conventional procedures. The conditions and results are shown in Table A, including properties of films produced therefrom.

TABLE A

| Example | 1 | 2 | — | 3 | 4 | — |
|---|---|---|---|---|---|---|
| Prepolymer A, pts. | 350 | — | — | 350 | — | — |
| Prepolymer B, pts. | — | 350 | — | — | 350 | — |
| Comparative I, pts. | — | — | 350 | — | — | 350 |
| Ethylenediamine, pts. | 2.4448 | 2.5942 | 2.6494 | 2.7162 | 2.8834 | 2.9448 |
| 1,3-Diaminopropane, pts. | 0.8149 | 0.8647 | 0.8832 | 0.4793 | 0.5088 | 0.5197 |
| Diethylamine, pts. | 0.4810 | 0.5102 | 0.5218 | 0.4810 | 0.5702 | 0.5218 |
| DMF, pts. | 354 | 318 | 354 | 354 | 318 | 354 |
| Temp., °C. | 23–42 | 23–42 | 24–43 | 22–43 | 24–44 | 23–42 |
| Elastomer Solution Properties | | | | | | |
| Total solids, % | 25.5 | 25.6 | 25.5 | 25.4 | 25.6 | 26.0 |
| Red. visc., 30°C | 1.0 | 0.85 | 0.95 | 1.0 | 0.93 | 0.85 |
| Brookfield visc., cps × 10⁻³ | | | | | | |
| initial | 22.0 | 11.0 | 10.8 | 12.8 | 19.0 | 7.0 |
| aged(days) | 28(21) | 25.8(8) | 25.6(17) | 25.4(15) | gel(5) | gel(5) |
| Film properties (ASTM D-412-62T) | | | | | | |
| Thickness, mils | 7 | 8 | 7 | 8 | 7 | 8 |
| Tensile strength, psi × 10⁻³ | 6.23 | 5.55 | 7.70 | 5.00 | 5.88 | 5.08 |
| Elongation, % | 570 | 550 | 622 | 519 | 575 | 550 |
| Tensile modulus, psi at elongation of | | | | | | |
| 100% | 550 | 810 | 700 | 650 | 780 | 640 |
| 300%, × 10⁻³ | 1.41 | 2.08 | 1.54 | 1.58 | 2.04 | 1.49 |
| 500%, × 10⁻³ | 3.81 | 4.36 | 5.35 | 4.75 | 4.48 | 4.43 |

The properties measured indicated that there was no observable response on the product when the process of this invention was used in the prepolymer preparation phase of this condensation reaction and that satisfactory prepolymer and elastomer products are produced.

EXAMPLES 5 to 7

The study then continued to the second phase, the chain extension, of the process for producing copoly-(urethane-urea) elastomers. In this part of the study the process of this invention was applied to the chain extension phase in the production of the copoly(urethane-urea) elastomers. Isocyanate-terminated prepolymers were produced by charging 206.8 parts of 4,-4'-methylenebis(phenylisocyanate) and 206.8 parts of dimethylformamide to a polymerization reactor and then warming to 40°C. To this solution there was added, over a period of about 2.5 hours, a solution of 320 parts of the same diethylene glycol started polycaprolactone diol and 480 parts of the same reaction product of tolylene diisocyanate with the diethylene glycol started polycaprolactone diol used in Example 1 in 800 parts of dimethylformamide. The temperature was maintained at about 40°C. Following the completion of the addition, the reaction mixture was stirred at 40°C. for an additional thirty minutes. Three isocyanate-terminated prepolymers were produced as clear 50 percent solids solutions having average equivalent weights of 3,749 (Prepolymer 3,749), 3,063 (Prepolymer 3,063) and 3,088(Prepolymer 3,088). These prepolymers were then used to produce copoly(urethane-urea) elastomers by chain extension and chain termination using three different reaction procedures (two procedures serving as control and comparative methods) and at two different concentrations of chain extenders and chain terminators.

In this series 187.5 parts of the isocyanate-terminated prepolymer produced as described above and 150 parts of dimethylformamide were initially charged to the polymerization zone; nitrogen was blown through the reactor throughout the entire reaction. The primary polymerizable feed composition in the primary feed source had an initial content of 0.8474 part of ethylenediamine (EDA), 0.2127 part of dibutylamine (DBA), and 22 parts of dimethylformamide (DMF). The secondary feed composition in the secondary feed source had an initial content of 0.6965 part 1,2-diaminopropane (PDA), 0.175 part of DBA and 17 parts of DMF. These quantities represent a ratio of EDA/PDA/DBA equivalents used per free isocyanato (NCO) group equivalent used of 0.564/0.376/0.06/1 in the production of Elastomer A and Comparatives II and V. The EDA/PDA/DBA/NCO ratio of equivalents used in the production of Elastomers B and C and Comparatives II, IV, VI and VII was 0.571/0.379/0.05/1. While maintaining a temperature of 24° to 32°C. in the polymerization zone, primary polymerizable feed composition from primary feed source was fed into the polymerization zone at a rate of 15 ml. per minute. Simultaneously, secondary feed composition from secondary feed source was fed into primary feed source at a rate of 6 ml. per minute and thoroughly mixed therein. The feeding sequences caused a continual change in the compositional content of the reactants in primary feed source during the reaction. The feed time covered a period of 3 minutes and thereafter the reaction mixture was stirred at 32°C. for 15 minutes. Three copoly(urethane-urea) elastomers were produced by this procedure and they are identified in the following table as Elastomers A, B and C in Examples 5, 6 and 7.

The elastomers produced were compared to elastomers obtained by two other procedures. In the first of these comparative procedures a single mixture of all of the amines in DMF solution was prepared and this was added to the prepolymer as a single feed stream over a period of three minutes. The three copoly(urethane-urea) elastomers produced by this method are identified as Comparatives II, III and IV. In the second of the comparative procedures two mixtures of the amines were prepared, the first mixture contained 0.8474 part of ethylenediamine, 0.2127 part of dibutylamine and 22 parts of DMF and the second mixture contained 0.6965 part of 1,2-diaminopropane, 0.175 part of dibutylamine and 17 parts of DMF. In this procedure all of the first mixture of amines was added to the prepolymer and then all of the second mixture of amines was added to the prepolymer. The three copoly(urethane-urea) elastomers produced by this method are identified as Comparatives V, VI and VII. In all instances the total feed time covered a period of three minutes.

The conditions and results of this second phase study are shown in Table B, including some properties of films produced from the elastomers.

TABLE B

| Example | 5 | — | — | 6 | — | — | 7 | — | — |
|---|---|---|---|---|---|---|---|---|---|
| Elastomer | A | — | — | B | — | — | C | — | — |
| Comparative | — | II | V | — | III | VI | — | IV | VII |
| Polymerization Reactor Charge, pts. | | | | | | | | | |
| Prepolymer 3749 | 187.5 | 187.5 | 187.5 | — | — | — | — | — | — |
| Prepolymer 3063 | — | — | — | 306.3 | 310.8 | 306.3 | — | — | — |
| Prepolymer 3088 | — | — | — | — | — | — | 308.8 | 308.8 | 308.8 |
| DMF | 150 | 150 | 150 | 267.3 | 260.8 | 267.3 | 269.9 | 269.9 | 269.9 |
| Primary Polymerizable Feed Composition (Initial Content), pts. | | | | | | | | | |
| EDA | 0.8474 | a 0.8474 | b 0.8474 | 1.7123 | 1.7123 | b. 1.7123 | 1.7 | a 1.7 | b. 1.7123 |
| PDA | — | a 0.6965 | — | — | — | — | — | a 1.4083 | — |
| DBA | 0.2127 | a 0.3877 | b 0.2127 | 0.3878 | a 0.6463 | b 0.3878 | 0.3878 | a 0.6463 | b 0.3878 |
| DMF | 22 | 39 | 22 | 25 | 55.8 | 25 | 30 | 50 | 30 |
| Secondary Feed Composition (Initial Content), pts. | | | | | | | | | |
| EDA | — | — | — | — | — | — | — | — | — |
| PDA | 0.6965 | N/A | c 0.6965 | 1.4083 | N/A | c 1.4083 | 1.4083 | N/A | c 1.4083 |
| DBA | 0.175 | | c 0.175 | 0.2585 | | c 0.2585 | 0.2585 | | c 0.2585 |
| DMF | 17 | | 17 | 25 | | 25 | 20 | | 20 |
| Elastomer Solution Properties | | | | | | | | | |
| Total solids, % | 25.5 | 25.5 | 25.8 | 25.0 | 25.3 | 25.0 | 25.0 | 24.9 | 25.0 |
| Red. visc., 30°C. | 0.84 | 0.92 | 1.07 | 0.86 | 0.90 | 0.87 | 1.15 | 1.15 | 1.04 |
| Brookfield visc., cps × $10^{-3}$ initial | 15.2 | 17.2 | 23.0 | 5.2 | 7.8 | 5.4 | 33.0 | 36.0 | 24.0 |
| Film Properties | | | | | | | | | |
| Thickness, mils | 6.7 | 7.5 | 8.0 | 6.5 | 6.7 | 7.3 | 7.2 | 7.4 | 7.4 |
| Tensile strength* | 47.5 | 48.3 | 38.5 | 62.7 | 65.4 | 68.4 | 67.5 | 70.6 | 68.0 |
| Elongation, % | 625 | 625 | 600 | 600 | 622 | 600 | 600 | 586 | 608 |
| Tensile modulus, cycle 1, psi at elongation of | | | | | | | | | |
| 100% | 450 | 480 | 450 | 607 | 587 | 680 | 580 | 580 | 547 |
| 300% × $10^{-2}$ | 11.0 | 11.0 | 10.0 | 13.5 | 12.9 | 14.2 | 12.7 | 13.1 | 12.3 |
| 500% × $10^{-2}$ | 29.7 | 29.0 | 26.0 | 37.5 | 36.4 | 44.5 | 41.0 | 41.2 | 39.4 | a — represents total amount of each in the single feed stream
b — represents amount of each in the first mixture of amines
c — represents amount of each in the second mixture of amines
N/A — not applicable
*Tensile strength reported in psi × $10^{-2}$.

EXAMPLES 8 to 11

The third phase, the chain termination, of the process for producing copoly(urethane-urea) elastomers showed the greatest noticeable response to the use of the process of this invention. In this portion of the study of the process for producing the elastomers the chain terminator was added by the process of this invention and a noticeable response in molecular weight distribution of the polymer species in the elastomer was observed. The isocyanate-terminated prepolymers were produced as described for Examples 5 to 7; they had the average equivalent weights set forth in the table that follows. The amine equivalent weight of each was determined by the standard procedure involving reaction with an excess of di-n-butylamine followed by back-titration of the excess amine with a standardized hydrochloric acid solution, this procedure was used throughout the experimental work in this application. An amount of prepolymer equal to 0.1 amine equivalent was used in each instance in producing the copoly(urethane-urea) elastomers.

In this series, 0.1 amine equivalent of the prepolymer solution and a sufficient quantity of DMF to ensure that the desired final total solids would be realized was initially charged to the polymerization zone, which was purged with dry nitrogen throughout the entire reaction. The feed rates and the initial reactant contents in each feed source are shown in Table C. The feeding sequences caused a continual change in the compositional content of the reactants in the primary feed source and a continuous change in the ratio of chain extender and chain terminator in the primary polymerizable feed composition entering the polymerization zone during the reaction. The initial temperature in the polymerization zone was about 23°C. The total feed time was two minutes and the reaction exotherm was about 10°C. After all of the reactants had been added to the polymerization zone the mixture was stirred an additional fifteen minutes and then allowed to stand overnight. The next morning the viscosities were determined and films were cast onto glass plates using a doctor knife. After drying overnight in a forced air oven at 80°C., the films were tested for tensile properties and used in the gel permeation chromatography work for molecular weight distribution determination.

For comparative purposes an isocyanate-terminated prepolymer was produced in the same manner. This was then reacted by feeding a mixture of all the chain extenders and terminator as a single stream to the prepolymer under the same reaction conditions described above. By this procedure the concentration of each reactant in the feed is constant throughout the feed period to the reactor. This copoly(urethane-urea) elastomer is Comparative VIII in the Table C.

Also for comparative purposes two additional elastomers were produced; in both instances the isocyanate-terminated prepolymers were produced in the same manner as above and the were then reacted with the chain extenders and chain terminator by two different procedures. In the first procedure a DMF solution of the chain terminator was fed to the isocyanate-terminated pre polymer first and then a DMF solution of the mixture of chain extenders was fed to the reaction mixture; the copoly(urethane-urea) elastomer produced is identified as Comparative IX in Table C. In the second procedure a DMF solution of the mixture of chain extenders was fed to the isocyanate-terminated prepolymer first and then a DMF solution of the chain terminator was fed to the reaction mixture; the copoly(urethane-urea) elastomer produced is identified as Comparative X in Table C.

In Examples 8 to 11 and Comparatives VIII to X the chain extender was an 80/20 mixture of ethylenediamine 1,3-diaminopropane and a total of 0.094 equivalent per 0.1 amine equivalent in the propolymer was used; the chain terminator was dibutylamine and a total of 0.006 equivalent per 0.1 amine equivalent in the prepolymer was used.

TABLE C

| Example | 8 | 9 | 10 | 11 | | | |
|---|---|---|---|---|---|---|---|
| Comparative | | | | | VIII | IX | X |
| Polymerization Reactor Charge | | | | | | | |
| Prepolymer equiv. wt. | 2834 | 2834 | 2893 | 2893 | 3102 | 3055 | 3055 |
| Parts charged | 283.4 | 283.4 | 289.3 | 289.3 | 310.2 | 305.5 | 305.5 |
| DMF, pts. | 261.1 | 261.1 | 267 | 267 | 287.9 | 283.1 | 283.1 |
| Primary Polymerizable Feed Composition (Initial Content), pts. | | | | | a | b | b |
| EDA | 2.3484 | — | 1.2156 | 1.9452 | 2.3484 | — | 2.3484 |
| PDA | 0.5871 | — | 0.3041 | 0.4863 | 0.5871 | — | 0.5871 |
| DBA | — | 0.7756 | 0.1689 | 0.2702 | 0.7755 | 0.7755 | — |
| DMF | 26.42 | 6.98 | 15.2 | 27 | 31.4 | 6.98 | 26.4 |
| Feed rate, ml/min. | 19.6 | 19.6 | 19.8 | 22.0 | — | — | — |
| Secondary Feed Composition (Initial Content), pts. | | | | | | | |
| EDA | — | 2.3484 | 1.1326 | 0.4038 | — | 2.3484 | — |
| PDA | — | 0.5871 | 0.2831 | 0.1009 | — | 0.5871 | — |
| DBA | 0.7756 | — | 0.6068 | 0.5047 | — | — | 0.7755 |
| DMF | 6.98 | 26.42 | 18.2 | 10 | — | 26.4 | 6.98 |
| Feed rate, ml/min. | 4.1 | 15.5 | 10.8 | 5.9 | — | — | — |
| Elastomer Solution Properties | | | | | | | |
| Total solids, % | 25.3 | 25.1 | 25.1 | 25.2 | 25.0 | 25.0 | 25.5 |
| Red. visc., 30°C. | 1.0 | 1.0 | 1.06 | 1.1 | 0.95 | 1.37 | 1.92 |
| Brookfield visc., cps.× $10^{-3}$, 25°C. | | | | | | | |
| initial | 17.0 | 24.2 | 15.2 | 15.6 | 10.4 | 136 | 1,640 |
| aged three weeks | 27.0 | 34.0 | 54.0 | 13.0 | 34.0 | 157 | gel |
| Film Properties | | | | | | | |
| Thickness, mils | 7.4 | 7.4 | 7.5 | 6.8 | 7.1 | 7.4 | 7.0 |
| Tensile strength, psi × $10^{-2}$ | 66.0 | 67.2 | 62.2 | 50.9 | 67.1 | 71.6 | 58.9 |
| Elongation, % | 642 | 614 | 640 | 631 | 648 | 606 | 589 |
| Modulus, Cycle 1, psi, at elongation of | | | | | | | |
| 100% | 650 | 670 | 650 | 623 | 660 | 630 | 628 |
| 300%, × $10^{-2}$ | 13.7 | 14.6 | 13.8 | 12.4 | 14.5 | 14.6 | 14.3 |
| 500%, × $10^{-2}$ | 36.6 | 39.6 | 35.4 | 30.7 | 37.0 | 41.8 | 38.6 |

TABLE C—Continued

| Example | 8 | 9 | 10 | 11 | | | |
|---|---|---|---|---|---|---|---|
| Comparative | | | | | VIII | IX | X |
| Molecular weight distribution | | | | | | | |
| Species below 5,000 M.W.,% | 0.11 | 2.55 | 1.11 | 1.21 | 1.27 | 1.3 | 0.55 |
| Species above 500,000 M.W.,% | 0.17 | 0.98 | 2.4 | 2.56 | 4.4 | 8.9 | 7.2 | a — reactants added to reactor as a single feed stream in two minutes
b — mixture identified as primary polymerizable feed added to reactor above in one minute; then mixture identified as secondary polymerizable feed added directly to reactor as a separate feed in one minute.

EXAMPLES 12 to 22

A series of experiments was carried out, Table D, varying the chain terminator level at 0.04, 0.05 and 0.06 amine equivalent per isocyanato equivalent. The copoly(urethane-urea) elastomers produced by the process of this invention are set forth in Examples 12 to 22, in which the manner in which the reactants were fed was varied. For comparative purposes the same reactants were used to produce the elastomers by conventional processes; these are described below as set forth in Comparatives XI to XV.

In Examples 12 to 22, the isocyanate-terminated prepolymers used were produced as described in Examples 5 to 7; these were analyzed and their average amine equivalent weights are set forth in Table D. The prepolymers were then chain extended and chain terminated to produce the copoly(urethane-urea) elastomers. There were initially charged to the polymerization zone the indicated amounts of prepolymer and dimethylformamide containing 150 ppm of phosphoric acid. The primary polymerizable feed composition and the secondary feed composition initially contained the reactants set forth in Table D. During the reaction the primary polymerizable feed composition was fed from primary feed source into the polymerization zone at the feed rate indicated. Simultaneously secondary feed composition was fed from secondary feed source into primary feed source at the feed rate indicated. The feeding sequences result in a continual change in the compositional content of the primary polymerizable feed compositional, as described in Examples 5 to 7; the total feed time was two minutes, the reaction was carried out under a nitrogen atmosphere starting at a temperature of 25°C. and the exotherm raised the temperature to about 35°C. to 40°C. The elastomers were cast into films and also used to spin fibers.

A typical wet-spinning process was employed. The polymer, in DMF solution, was metered by gear pumps through appropiate spinnerettes, into a coagulating bath containing a mixture of water and DMF. In usual practice the DMF content of this bath was about 5 to 15 percent and the temperature of the bath was 70°-80°C. The fused, multifilament fibers emerging from the coagulation bath were then passed over a washing roll to remove additional solvent and thence guided onto a steam-heated drying roll operating at about 175°-185°C. The dried fiber was taken across a change-of-direction roll and over a lubricating roll before being passed through a traversing guide which wound it onto a collecting bobbin. The finished fiber was collected on this bobbin at speeds of about 200-350 feet per minute.

Comparative samples XI to XIII were produced using the same prepolymers. However, in these experiments a mixture of all the chain extenders and the chain terminator was added as a single stream to the prepolymer solution over a two minutes feed time at the same reaction conditions used for Examples 12 to 22. In this procedure there is no change in the compositional content of the feed introduced into the reactor.

In Comparative XIV, all of the chain extender was added to the prepolymer in the polymerization zone over a one minute period; then all of the chain terminator was added directly to the reactor over a one minute period and the mixture was stirred to completion of the reaction. Here, also, there is no change in the compositional contents of the two feeds introduced into the reactor.

In Comparative XV, all of the chain terminator and a minor amount of the chain extender are added as a single mixture to the prepolymer in the polymerization zone over a one minute period. Then the balance of the chain extender was added directly to the reactor over a one minute period and the mixture was stirred to completion of the reaction. Again, there was no change in the compositional contents of the two feeds introduced into the two feeds introduced into the reactor.

TABLE D

| Example | 12 | 13 | 14 | 15 | 16 | 17 |
|---|---|---|---|---|---|---|
| Polymerization Reactor Charge | | | | | | |
| Prepolymer, pts. | 1006 | 1006 | 1011 | 1023 | 1037 | 1016 |
| amine equiv. | 0.35 | 0.35 | 0.35 | 0.35 | 0.35 | 0.35 |
| DMF, pts. | 1170 | 1079 | 998 | 1193 | 1112 | 996 |
| Primary Polymerizable Feed Composition (Initial Content), pts. | | | | | | |
| EDA | 4.9210 | 5.0584 | 5.1956 | 8.3947 | 8.3072 | 8.2198 |
| PDA | 1.2303 | 1.2646 | 1.2989 | 2.0987 | 2.0768 | 2.0449 |
| DBA | — | — | — | — | — | — |
| DMF | 24.6 | 25.3 | 26 | 42 | 41.5 | 41.1 |
| Feed rate, ml/min. | 32.6 | 33.8 | 35 | 32.9 | 33.8 | 34.8 |
| Secondary Feed Composition (Initial Content), pts. | | | | | | |
| EDA | 3.4734 | 3.2489 | 3.0242 | — | — | — |
| PDA | 0.8684 | 0.8122 | 0.7560 | — | — | — |
| DBA | 1.8095 | 2.2619 | 2.7143 | 1.8095 | 2.2619 | 2.7143 |
| DMF | 24.6 | 25.3 | 26 | 7.24 | 9.05 | 10.9 |
| Feed rate, ml/min | 16.35 | 17 | 17.3 | 5 | 6.2 | 7.45 |

TABLE D—Continued

| Example | 12 | 13 | 14 | 15 | 16 | 17 |
|---|---|---|---|---|---|---|
| Elastomer Solution Properties | | | | | | |
| Total solids, % | 23 | 24 | 24.9 | 23.2 | 24.1 | 25.1 |
| Red. visc., 30°C. | 1.13 | 1.03 | 0.87 | 1.19 | 1.12 | 1.02 |
| Film Properties | | | | | | |
| Thickness, mils | 7.3 | 7.0 | 7.1 | 6.0 | 7.9 | 6.6 |
| Tensile strength, psi × $10^{-2}$ | 72.8 | 71.7 | 67.2 | 83.5 | 69.0 | 67.0 |
| Elongation, % | 569 | 588 | 606 | 620 | 630 | 627 |
| Modulus, Cycle 1, psi, at elongation of | | | | | | |
| 100% | 713 | 707 | 695 | 712 | 630 | 673 |
| 300% × $10^{-2}$ | 16.4 | 16.2 | 15.9 | 16.8 | 14.9 | 15.4 |
| 500% × $10^{-2}$ | 50.9 | 46.1 | 40.9 | 47.8 | 38.5 | 37.9 |
| Fiber Properties (ASTM D-2653-67-T and ASTM C-66-4-T) | | | | | | |
| Denier | 95 | 95 | 108 | 92 | 98 | 90 |
| Tenacity, gpd | 0.422 | 0.479 | 0.564 | 0.388 | 0.437 | 0.53 |
| Elongation, % | 409 | 461 | 525 | 377 | 473 | 523 |
| 300% modulus, gpd | 0.294 | 0.278 | 0.233 | 0.296 | 0.267 | 0.238 |

| Example | 18 | 19 | 20 | 21 | 22 |
|---|---|---|---|---|---|
| Polymerization Reactor Charge | | | | | |
| Prepolymer, pts. | 881 | 917 | 830 | 881 | 885 |
| amine equiv. | 0.3 | 0.3 | 0.3 | 0.3 | 0.3 |
| DMF, pts. | 1026 | 906 | 881 | 945 | 870 |
| Primary Polymerizable Feed Composition (Initial Content), pts. | | | | | |
| EDA | 0.4444 | 0.5302 | 1.8612 | 0.8508 | 1.1938 |
| PDA | 0.1148 | 0.1325 | 0.4653 | 0.2127 | 0.2984 |
| DBA | 1.551 | 1.9388 | 2.3265 | 1.9389 | 2.3265 |
| DMF | 8.44 | 10.4 | 12.3 | 12 | 15.4 |
| Feed rate, ml/min. | 28.2 | 27.6 | 29.8 | 29.1 | 29.8 |
| Secondary Feed Composition (Initial Content), pts. | | | | | |
| EDA | 6.748 | 6.5903 | 6.4396 | 6.2695 | 5.8517 |
| PDA | 1.687 | 1.6476 | 1.6099 | 1.5674 | 1.4629 |
| DBA | — | — | — | — | — |
| DMF | 33.7 | 33 | 32.2 | 31.4 | 29.3 |
| Feed rate, ml/min. | 22.5 | 21.9 | 21.4 | 20.1 | 19.5 |
| Elastomer Solution Properties | | | | | |
| Total solids, % | 23 | 24 | 25 | 24.1 | 25.1 |
| Red. visc., 30°C. | 1.37 | 1.18 | 1.14 | 1.12 | 1.06 |
| Film Properties | | | | | |
| Thickness, mils | 7.1 | 6.4 | 7.4 | 6.4 | 7.4 |
| Tensile strength, psi × $10^{-2}$ | 74.9 | 72.4 | 67.0 | 74.9 | 75.0 |
| Elongation, % | 605 | 596 | 645 | 625 | 638 |
| Modulus, Cycle 1, psi, at elongation of | | | | | |
| 100% | 645 | 713 | 620 | 608 | 647 |
| 300%, × $10^{-2}$ | 16.0 | 16.1 | 14.4 | 15.1 | 15.0 |
| 500%, × $10^{-2}$ | 43.9 | 45.0 | 37.1 | 40.3 | 37.7 |
| Fiber Properties | | | | | |
| Denier | 94 | 98 | 89 | 93 | 101 |
| Tenacity, gpd | 0.345 | 0.40 | 0.455 | 0.468 | 0.492 |
| Elongation, % | 302 | 391 | 433 | 459 | 496 |
| 300% Modulus, gpd | 0.315 | 0.308 | 0.297 | 0.298 | 0.252 |

| Comparative | XI | XII | XIII | XIV | XV |
|---|---|---|---|---|---|
| Polymerization Reactor Charge | | | | | |
| Prepolymer, pts. | 1019 | 1024 | 1019 | 611 | 611 |
| amine equiv. | 0.35 | 0.35 | 0.35 | 0.2 | 0.2 |
| DMF, pts. | 1118.3 | 1099.7 | 1006 | 603.8 | 603.8 |
| Primary Polymerizable Feed Composition (Initial Content), pts. | | | | | |
| EDA | 8.392 | 8.307 | 8.220 | 4.697 | 0.7958 |
| PDA | 2.098 | 2.077 | 2.055 | 1.174 | 0.1990 |
| DBA | 1.8095 | 2.2619 | 2.7143 | — | 1.551 |
| DMF | 49.2 | 50.6 | 52.1 | 23.49 | 10.2 |
| Secondary Feed Composition (Initial Content), pts. | | | | | |
| EDA | — | — | — | — | 3.9011 |
| PDA | — | — | — | — | 0.9753 |
| DBA | — | — | — | 1.551 | — |
| DMF | — | — | — | 6.2 | 19.5 |
| Elastomer Solution Properties | | | | | |
| Total solids, % | 23.1 | 24.2 | 25.1 | 25.6 | 25.5 |
| Red. visc., 30°C. | 1.13 | 0.98 | 0.90 | 1.58 | 1.24 |
| Film Properties | | | | | |
| Thickness, mils | 6.4 | 7.2 | 6.8 | 7.7 | 7.4 |
| Tensile strength, psi × $10^{-2}$ | 82.3 | 68.4 | 67.0 | 54.2 | 64.5 |
| Elongation, % | 571 | 599 | 600 | 622 | 645 |
| Modulus, Cycle 1, psi, at elongation of | | | | | |
| 100% | 680 | 685 | 698 | 582 | 593 |
| 300%, × $10^{-2}$ | 16.8 | 15.5 | 15.6 | 14.2 | 14.1 |
| 500%, × $10^{-2}$ | 50.1 | 42.0 | 42.5 | 34.0 | 38.5 |

TABLE D—Continued

| Comparative | XI | XII | XIII | XIV | XV |
|---|---|---|---|---|---|
| Fiber Properties | | | | | |
| Denier | 91 | 99 | 94 | — | — |
| Tenacity, gpd | 0.368 | 0.489 | 0.598 | — | — |
| Elongation, % | 370 | 452 | 517 | — | — |
| 300% Modulus, gpd | 0.28 | 0.279 | 0.249 | — | — |

EXAMPLE 23

Thermoplastic polyurethane elastomers obtained by extending isocyanate-terminated prepolymers with short chain diols of the type $HO\!+\!CH_2\!+\!_nOH$, where n has a value of from 2 to 6, are commercially important polymers. Depending upon the reactant ratios used in their preparation, they can serve either as adhesives or as coatings for flexible substrates such as cloth, leather, or vinyl. The preparation of a relatively "soft" polyurethane of this general type by both the conventional (random) feed technique and by the process of this invention is described in this example, where the difunctional chain extender is 1,4-butanediol and the monofunctional chain terminator is methoxytriglycol (the monomethylether of triethylene glycol).

The isocyanate-terminated prepolymer was prepared by charging to a 2-liter polymerization reactor equipped with an air-driven agitator, a feed tank, an inert gas inlet and a thermometer a mixture of 194g. (1.55 eq.) of 4,4'-methylenebis(phenylisocyanate) (MDI) and 194g. of N,N-dimethylformamide (DMF) containing 0.013 percent water. The solution was heated to 40°C and held at 38°–42°C. while a solution of 634g. (1.0eq.) of a diethylene glycol started poly(caprolactone) diol of nominal 1,250 molecular weight in 634g. of DMF was fed in over the course of one hour. Following completion of the feed, heating at 40°C was continued for an additional two hours. Analysis of the prepolymer by the standard procedure involving reaction with excess dibutylamine followed by back-titration with a standardized HCl solution indicated the equivalent weight of the prepolymer solution to be 3,761.

Three extensions of the above prepolymer were made, one being by the conventional known process (Comparative XVI) and two being by the process of this invention. The prepolymer was reanalyzed prior to each chain extension. The equipment used was the same as that described in the earlier examples. In Examples 23A and 23B, primary polymerizable feed composition was fed into the polymerization reactor from primary feed source while simultaneously feeding secondary feed composition into primary feed source from secondary feed source; in Comparative XVI the mixture of diol and monool was fed in as a uniform single stream; all as described in the previous examples. The reaction temperature used for the chain extension was 70°C, the feed time was 12 minutes, and the post-cook period was 10 minutes at 70°C.

The charges (weights in grams) used are summarized in Table E below along with polymer solution properties and film tensile properties (the films were formed by pouring the solutions into 2 inch × 4 inch × 60 mil teflon molds and drying overnight at 75°C). These films were clear, light yellow in color, and elastic in nature.

Small pieces of the above films were dissolved in tetrahydrofuran solvent to afford dilute solutions (0.25 percent) suitable for molecular weight distribution analysis by gel permeation chromatography. The chromatographic analysis was carried out with a Waters Co. commercial instrument using a differential refractometer for detection. The results of the this analysis are shown in Table E. The data reveals that the process of this invention can be used to increase or decrease, as desired, the high or low molecular weight ends of the distribution curve relative to the conventional procedure. Conditions featuring slow introduction of the chain terminator (23A) are especially desirable for minimizing formation of low molecular weight ends and maximizing formation of high molecular weight ends. In this particular series, the rather low $\overline{M}w$ values are consistent with the relatively low reduced viscosities of the materials, 0.52 – 0.65. These levels could obviously be raised by using a lesser amount of chain terminator in the extensions. For applications where easy flow-out is required, as in sprayable powders for coatings, for example, molecular weights in the range of those of the present might well be desirable.

TABLE E

| Example<br>Comparative | XVI | 23A | 23B |
|---|---|---|---|
| Polymerization Reactor Charge, pts. | | | |
| Prepolymer (0.07 eq.) | 263.27 | 263.27 | 285.81 |
| DMF | 87.3 | 87.3 | 97.0 |
| Dibutyltin dilaurate | 0.386 | 0.386 | 0.419 |
| Primary Polymerizable Feed Composition<br>(Initial Content), pts. | | | |
| Methoxytriglycol (0.0035 eq.) | 0.5747 | — | 0.5747 |
| 1,4-Butanediol (0.0665 eq.) | 2.9965 | 2.9965 | — |
| DMF | 32.14 | 26.97 | 5.17 |
| Feed rate, ml/min. | 3.14 | 3.14 | 3.14 |
| Secondary Feed Composition (Initial Content), pts. | | | |
| Methoxytriglycol (0.0035 eq.) | | 0.5747 | — |
| 1,4-Butanediol (0.0665) eq.) | N/A | — | 2.9965 |
| DMF | | 5.17 | 26.97 |
| Feed rate, ml/min. | | 0.50 | 2.64 |
| Polymer Solution Properties | | | |
| Total solids, % | 35.35 | 35.05 | 35.0 |
| Reduced viscosity, DMF, 30°C. | 0.62 0.65 | 0.52 | |
| Brookfield viscosity, cps | 20,400 | 25,000 | 5,200 |
| Film Properties (ASTM D-412-62T) | | | |
| Thickness, mils | 19 | 16 | 14 |
| Tensile strength, psi | 209 | 436 | 457 |
| Elongation, % | 1613 | 1330 | 1388 |
| 300% Modulus, psi | 104 | 133 | 179 |
| Molecular Weight Distribution | | | |
| Weight average, $\overline{M}w$ | 23,500 | 26,800 | 18,500 |
| Species below 5,000 MW, % | 12.18 | 10.63 | 14.4 |
| Species above 100,000 MW, % | 2.70 | 3.88 | 1.13 |

The low tensile strengths, low modulae, and high elongation of these films are to be expected from the formulation, the hard segment (1,4-butanediol) content of the formulations being low and the molecular weight only moderately high. The polymers produced by the process of this invention do, however, display strengths considerably greater than that of the polymer produced by the known conventional process.

EXAMPLE 24

Copoly(ureylene-urethanes) result from the extension of an isocyanate-terminated prepolymer with a primary or secondary hydrazine in the presence of a 1,1-disubstituted hydrazine as a chain terminator. Copoly-(ureylene-urethanes), although generally similar in properties to the counterpart copoly(urea-urethanes), are somewhat tougher polymers than the latter because the ureylene group is a particularly strong hydrogen-bonding function. Consequently, such polymers find application in ultra-high performance areas such as spandex-type elastic fibers.

The preparation of a representative aliphatic isocyanate-based copoly(ureylene-urethane) by both the conventional feed technique commonly used and by the process of this invention are described in this example. Here hydrazine, in the form of its hydrate, is used to chain extend and 1,1-dimethylhydrazine to chain terminate an isocyanate-terminated prepolymer derived from 4,4'-methylenebis-(cyclohexylisocyanate) and a diethylene glycol started poly(caprolactone) diol of about 2,000 molecular weight.

The isocyanate-terminated prepolymer was prepared by charging to a 3-liter glass polymerization reactor equipped with an air-driven agitator, a feed tank, an inert gas entry port and a thermometer a mixture of 175 g. (1.333 eq.) 4,4'-methylenebis(cyclohexylisocyanate), 450 g. of toluene, and 0.0994 g. of dibutyltin dilaurate catalyst. The charge was heated to 60°C and maintained at from 60°–63°C while a solution of 750 g. of the diethylene glycol started poly(caprolactone)diol (0.775 eq.) in 1,000 g. of toluene was fed in over a period of 35 minutes. Following completion of the feed period the charge was cooked-out for 3 hours at 60°C. The equivalent weight of the prepolymer thus produced was 4,652, by analysis, the viscosity was 50 cps and the solids content was 39 percent.

Three chain extensions of the above prepolymer were made, one being by the conventional known process (Comparative XVII) of adding a mixture of all the hydrazines as a single uniform stream to the reactor and two being by the process of this invention (24A and 24B), as described in Example 23. The prepolymer was reanalyzed prior to each extension to maintain stoichiometry as accurately as possible. The equipment used was similar to that described in earlier examples except that in 24A and 24B the secondary feed composition was gravity fed into the primary feed composition through a hypodermic syringe with needles which were found, by trial and error, to deliver the monomer feed, at the desired rates. The chain extensions were carried out at a temperature of 40°C, a total feed time of 10 minutes, and a cook-out time of 10 minutes at 40°C.

The charges used (weights in grams) in the three extensions are summarized in Table F along with polymer solution properties and film tensile properties (the films were formed by pouring the solutions into 2 inch × 4 inch × 60 mil teflon molds and drying for 6 hours at room temperature and then overnight at 75°C). These films were clear, water-white to light amber in color, and elastic in nature.

EXAMPLE 25

Aromatic polyureas are usually tough, brittle, high-melting, thermally-stable plastics which find speciality uses in areas such as military and space applications. The preparation of a novel aromatic polyurea from a diamine and a diisocyanate is described in this example, polymers being made by both conventional feed (Comparative XVIII) and by process of this invention (Example 25). After charging the polymerization reactor, the primary polymerizable feed composition from primary feed source was fed thereto while simultaneously feeding secondary feed composition from secondary feed source into primary feed source, for Example 25. For Comparative XVIII a uniform mixture of the aniline and SED was fed into the polymerization reactor as a single stream. The difunctional intermediates

TABLE F

| Example | | 24A | 24B |
|---|---|---|---|
| Comparative | XVII | | |
| Polymerization Reactor Charge | | | |
| Prepolymer | 238.35 | 238.35 | 191.08 |
| | (0.05 eq.) | (0.05 eq.) | (0.04 eq.) |
| Tetrahydrofuran | 25.0 | 25.0 | 20.0 |
| Isopropanol | 86.8 | 86.8 | 79.7 |
| Primary Polymerizable Feed Composition (Initial Content) | | | |
| Hydrazine hydrate | 1.1875 | — | 0.535 |
| | (0.0475eq.) | | (0.0214eq.) |
| 1,1-Dimethyl hydrazine | 0.15 | 0.15 | — |
| | (0.0025eq.) | (0.0025eq.) | |
| Isopropanol | 12.4 | 1.50 | 5.35 |
| Feed rate, ml/min. | 1.7 | 0.2 | 1.46 |
| Secondary Feed Composition (Initial Content) | | | |
| Hydrazine hydrate | | 1.1875 | 0.415 |
| | (0.0475eg.) | (0.0166eq.) | |
| 1,1-Dimethyl hydrazine | | — | 0.12 |
| | N/A | | (0.002eq.) |
| Isopropanol | | 11.88 | 5.35 |
| Feed rate, ml/min. | | 1.6 | 0.73 |
| Polymer Solution Properties | | | |
| Total solids, % | 26.5 | 27.3 | 26.3 |
| Reduced viscosity, 30°C.* | 0.52 | 0.48 | 0.55 |
| Brookfield viscosity, cps. | 620 | 680 | 1,100 |
| Film Properties (ASTM D-412-62T) | | | |
| Thickness, mils | 18.5 | 18.8 | 17.1 |
| Tensile strength, psi | 1,198 | 1,175 | 3,277 |
| 300% Modulus, psi | — | 1,160 | 1,123 |
| Elongation, % | 197 | 400 | 683 |

*Solvent used was 51.2% toluene, 8.8% tetrahydrofuran, 41% isopropanol mixture.

used are 4,4'-bis(p-amino-phenoxy) diphenyl sulfone (SED) and 4,4'-methylenebis(phenylisocyanate) (MDI), the chain terminator used in aniline, and the solvent is N,N-dimethylformamide(DMF). The reaction was carried out at 25°–30°C, the feed time was 2 minutes, and the post-reaction period of stirring was 10 minutes. The apparatus used was similar to that of earlier examples, consisting of a stirred 500cc glass polymerization reactor and graduated funnels with rate-adjustable stop-cocks as the monomer feed tanks to the reactor. The charges used are given below; the films were cast from DMF on glass plates and dried overnight at 75°C. See Table G.

TABLE G

| Example | 25 | |
|---|---|---|
| Comparative | | XVIII |
| Polymerization Reactor Charge, pts. | | |
| MDI | 12.51 | 6.255 |
| | (0.1 eq.) | (0.05 eq.) |
| DMF | 90.8 | 45.4 |
| Primary Polymerizable Feed Composition (Initial Content), pts. | | |
| Aniline | — | 0.0465 |
| | | (0.0005 eq.) |
| SED | 10.739 | 10.692 |
| | (0.04975 eq.) | (0.0495 eq.) |
| DMF | 10.739 | 10.74 |
| Feed rate, ml/min. | 10.8 | 5.4 |
| Secondary Feed Composition (Initial Content), pts | | |
| SED | 10.646 | |
| | (0.04925 eq.) | |
| Aniline | 0.0931 | |
| | (0.001 eq.) | N/A |
| DMF | 10.739 | |
| Feed rate, ml/min. | 5.4 | |
| Polymer Solution Properties | | |
| Total solids, % | 26.9 | 23.3 |
| Reduced viscosity, DMF, 30°C. | 0.43 | 0.29 |
| Brookfield viscosity, cps | 400 | 200 |
| Film Properties (ASTM D-882) | | |
| Melt temperature, °C. | 264 – 266 | 196 – 200 |
| Characteristics | tough, moderately brittle | tough, very brittle |
| Color | amber | amber |
| Tensile strength, psi | 7,523 | 8,100 |
| Elongation, % | 5.9 | 8.6 |
| 1% Secant Modulus, psi | 273,333 | 268,333 |

Example 26

The preparation of an aliphatic polyurea by the process of this invention is described in this example. Here the technique used was to extend with a 50/50 w/w mixture of ethylenediamine(EDA) and 1,3-diaminopropane (DAMP) an isocyanate-terminated prepolymer prepared from 2,5-dimethyl piperazine and a mixture of 4,4'-methylenebis(cyclohexylisocyanate) (RMDI) and 3-isocyanatomethyl-3,5,5-trimethylcyclohexyl isocyanate (IPDI). The chain terminating agent was dibutylamine and the reaction solvent was DMF.

To a 1-liter polymerization reactor equipped with a stirrer, nitrogen inlet, thermometer and feed tank there was charged a mixture of 23.5 g. (0.412 eq) 2,5-dimethylpiperazine and 321.7 g. of N,N-dimethylformamide (DMF). The mixture was cooled to 5°C and the temperature was maintained as low as possible with an ice bath while a mixture of 42.65 g. (0.325 eq.) of RMDI and 36.15 g. (0.325 eq) of IPDI was fed into the reactor as rapidly as possible. The reaction exotherm carried the temperature eventually to 30°C. After the feed was complete and the charge had been stirred for an additional 10 minutes, the slightly yellow isocyanate-terminated prepolymer solution was analyzed and found to have an isocyanate equivalent weight of 1761.

A portion of the above prepolymer solution containing 79.47 grams (0.045 equivalent) of the prepolymer and 43.08 grams of DMF were charged to a polymerization reactor and chain extended and chain terminated by the process of this invention. The primary polymerizable feed composition initially present in the primary feed source contained 1.4287 grams of a 50/50 mixture of EDA and DAMP (0.4275 equivalent) and 5.7148 grams of DMF. The secondary feed composition initially present in the secondary feed source contained 0.298 gram of dibutylamine (0.00225 equivalent) and 1.156 grams of DMF. Over a two minutes feed time, the primary polymerizable feed composition from primary feed source was fed into the polymerization reactor at a rate or 4.52 ml. per minute while simultaneously feeding secondary feed composition from secondary feed source into the primary feed source at a rate of 0.65 ml. per minute; the two feed sources emptied at the same time. The reaction product was a thixotropic, slightly turbid solution having a total solids content of 19.35 per cent, a reduced viscosity in DMF at 30°C. of 0.33 and a Brookfield viscosity of 600 cps. A film 3.4 mils thick cast from the solution was clear colorless, tough and hard; it had a tensile strength of 8,100 psi, an elongation of 4.2 per cent and a one per cent secant modulus of 297,500 psi (ASTM D-882). The solid polymer had a melting range of 205° to 220°C.

EXAMPLE 27

This example is similar to Example 26 except for the extender used. The prepolymer for this example was made from 2,5-dimethylpiperazine (0.3175 eq.) and a mixture of RMDI (0.2763 eq.) and IPDI(0.20 eq.) in DMF at 5°–25°C. and it had an analyzed equivalent weight of 1942 and a solids content of 23.2 percent.

A portion of the above prepolymer solution containing 77.68 grams (0.04 equivalent) of the prepolymer and 3.44 grams of DMF were charged to a polymerization reactor. The primary polymerizable feed composition initially present in the primary feed source contained 2.2241 grams (0.0199 equivalent) of $\beta,\beta'$-bis(3-aminopropoxy)-ethyl ether and 4.44 grams of DMF. The secondary feed composition initially present in the secondary feed source contained 0.1551 gram of dibutylamine (0.0012 equivalent), 2.0691 grams of $\beta,\beta'$-bis(3-aminopropoxy)ethyl ether and 4.44 grams pf DMF. Over a two minutes feed time, the primary polymerizable feed composition from primary feed source was fed into the polymerization reactor at a rate of 6.9 ml. per minute while simultaneously feeding secondary feed composition from secondary feed source into the primary feed source at a rate of 3.45 ml. per minute; the two feed sources emptied simultaneously. The reaction product was a clear thixotropic solution having a total solids content of 25.55 per cent, a reduced viscosity in a 3.3/1 chloroform/acetic acid solution at 30°C. of 0.95 and a Brookfield viscosity of 3,900 cps. The polyurea produced a clear, colorless, tough, hard film having a tensile strength of 8,900 psi, an elongation of 13.4 per cent and a one per cent secant modulus of 278,333 (ASTM D-882). The solid polymer had a melting range of 228° to 232°C.

EXAMPLE 28

This example was carried out in a manner similar to that described in Example 27. For comparative purposes the chain extension and chain termination were also carried out by the conventional procedure of adding a uniform mixture of the amines as a single feed stream (Comparative XIX). The prepolymer in these two runs was produced by charging to a polymerization reactor equipped with an agitator, nitrogen gas inlet, thermometer and feed tank a mixture of 55.575 grams (0.5 equivalent) of IPDI and 200 grams of DMF. Over a period of 12 minutes a mixture of 27.66 grams of $\beta,\beta'$-bis(3-aminopropoxy)ethyl ether in 50 grams of DMF was introduced in a dropwise manner, permitting the temperature to rise exothermically to 24°C. The reaction mixture was stirred for 10 minutes and the amber colored isocyanate-terminated prepolymer solution was discharged from the reactor. The equivalent weight of the prepolymer analyzed as 1,365. A portion of the prepolymer solution was used after reanalysis to produce a polyurea by the process of this invention. An amount of the solution containing 149.6 grams of the prepolymer (0.1 equivalent) was placed in a polymerization reactor and 50.5 grams of DMF added thereto. The polymerizable feed composition initially present in the primary feed source contained 3.444 grams of m-xylylene diamine and 6.88 grams of DMF. The secondary feed composition initially present in the secondary feed source contained 3,230 grams of m-xylylene diamine, 0.2143 gram of benzylamine and 6.88 grams of DMF. Over a two minutes feed time, the primary polymerizable feed composition was fed from primary feed source into the polymerization reactor at a rate of 11.25 ml. per minute while simultaneously feeding secondary feed composition from secondary feed source into the primary feed source at a rate of 5.62 ml. per minute. The polyurea solution produced had a total solids content of 22.4 per cent, a reduced viscosity in DMF at 30°C. of 0.235 and a Brookfield viscosity of 160 cps. A film 7.6 mils thick cast from the solution was clear, colorless and tough; it had a tensile strength of 2,983 psi, an elongation of 3.3 per cent and a one per cent secant modulus of 144,333 psi. The solid polyurea had a melting range of 205 to 210°C.

The control, Comparative XIX was produced by charging 68.25 grams of the prepolymer (0.05 equivalent) and 27.37 grams of DMF to a polymerization reactor. A uniform mixture of 3.337 grams of m-xylylene diamine, 0.107 gram of benzylamine and 6.88 grams of DMF was added as a single stream at a feed rate of 5.62 ml. per minute over a two minutes feed time. The polyurea produced had a total solids content of 21.45 per cent, a reduced viscosity in DMF at 30°C. of 0.196 and a Brookfield viscosity of 115 cps. A film 6.6 mils thick cast from the solution was clear colorless and fairly tough; it had a tensile strength of 3,860 psi, an elongation of 3.5 per cent and a one per cent secant modulus of 176,677 psi (ASTM D–882). The solid had a melting range of 190°C. to 195°C.

What we claim is:

1. A process for controlling the molecular weight distribution of condensation polymers produced by a reactant starved condensation polymerization reaction comprising introducing at least one primary polymerizable feed composition comprising condensation polymerizable reactants and chain terminator from at least one primary feed source to a polymerization zone containing reactant condensation polymerizable therewith while simultaneously feeding at least one secondary feed composition from at least one secondary feed source to at least one of said primary feed sources, the compositional content of the primary polymerizable feed composition in said primary feed source continually changing during the introduction of said secondary feed composition thereto, and simultaneously condensation polymerizing the reactants mixture in the polymerization zone.

2. A process as claimed in claim 1 wherein there is a single primary feed zone and a single secondary feed zone.

3. A process as claimed in claim 1 wherein there is a single primary feed zone and a plurality of secondary feed zones.

4. A process as claimed in claim 1 wherein there are a plurality of primary feed zones and a single secondary feed zone.

5. A process as claimed in claim 1 wherein there are a plurality of primary feed zones and a plurality of secondary feed zones.

6. A process as claimed in claim 1 wherein the condensation polymer is a urethane containing polymer.

7. A process as claimed in claim 6 wherein the urethane polymer is an elastomer.

8. A process as claimed in claim 1 wherein the condensation polymer is a polyurea.

9. A condensation polymer produced by the process claimed in claim 1.

* * * * *